Feb. 2, 1954 G. C. SZIKLAI 2,668,190

TELEVISION IMAGE PICKUP SYSTEM

Filed July 5, 1947 2 Sheets-Sheet 1

INVENTOR.
GEORGE C. SZIKLAI

BY Samuel B. Smith

ATTORNEY

Feb. 2, 1954 G. C. SZIKLAI 2,668,190

TELEVISION IMAGE PICKUP SYSTEM

Filed July 5, 1947 2 Sheets-Sheet 2

INVENTOR.
GEORGE C. SZIKLAI

BY Samuel B. Smith

ATTORNEYS.

Patented Feb. 2, 1954 2,668,190

UNITED STATES PATENT OFFICE 2,668,190

TELEVISION IMAGE PICKUP SYSTEM

George C. Sziklai, Princeton, N. J., assignor to Radio Corporation of America, a corporation of Delaware Application July 5, 1947, Serial No. 759,279

6 Claims. (Cl. 178—7.2)

This invention relates to television, and more particularly to the conversion of images into electrical signal trains.

There are several possible methods for the transmission of images of finite detail and discontinuous or limited motion. That involving the process of scanning has been chosen as the most practical. The process consists of moving an exploring element or spot over the image to be transmitted in a periodically repeated path covering the image area. The exploring element is arranged so that it generates a signal which indicates the brightness of the image at its instantaneous position. This signal is then transmitted over the communication channel to reproducing equipment wherein a reproducing spot whose brightness is controlled by the signal is moved over a viewing screen in a path similar to and synchronous with that of the exploring element at the transmitting station. Thus, the reproducing spot reconstructs on the viewing screen the magnitude, position and brightness distribution of the image area.

The element in a television system which converts the light image into a train of electrical signals or the video signal is called the television camera or pickup device.

This invention has for its primary object the provision of an improved device for converting images into electric signal trains.

Another object of the invention is the provision of a television camera having improved signal-to-noise ratios in the translation of images into electric energy.

Other and incidental objects of the invention will be apparent to those skilled in the art from a reading of the following specification and an inspection of the accompanying drawing in which Figure 1 illustrates schematically and by block diagram one form of this invention;

Figure 1:
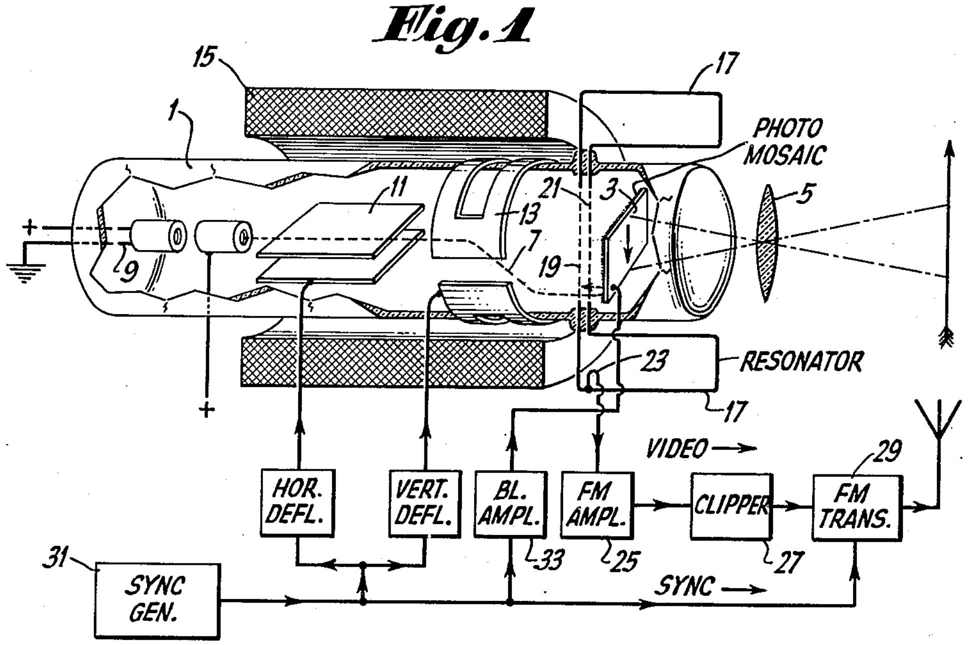

Turning now in more detail to Figure 1, there is shown an evacuated envelope 1 containing a photo mosaic electrode 3 upon which is focused an optical image of an object or scene to be televised.

The mosaic electrode 3 consists of a flat plate of mosaic or other suitable insulating material on which there are deposited several million separately insulated hemispheres or globules of silver. These silver globules are treated with a surface layer of cesium oxide and are thereby endowed with the property of releasing negative electric charge when illuminated. The scene to be transmitted is focused through lens 5 on electrode 3 in much the same fashion as if the plate were a film in an ordinary photographic camera. The light passing through the plate to the photosensitive globules releases a negative charge from the silver-cesium globules in proportion to the illumination falling on them.

It follows, therefore, that the optical image may then be translated into an electrical signal by an appropriate exploration of the photo mosaic surface by a scanning medium.

This is accomplished by scanning the photo mosaic 3 with an electron beam 7 generated by an electron gun 9. Electron guns are well known in the art, and need no detailed description here, except to refer to the following articles, which describe in detail their theory and operation: "Theory of the Electron Gun" by I. G. Maloff and D. W. Epstein in the "Proceedings of the Institute of Radio Engineers" for December 1934, and "The Improved Electron Gun for Cathode Ray Tubes" by L. E. Swedlund in "Electronics" for March 1946.

The electron beam 7 is deflected to provide the necessary scanning raster by deflection plates 11 and deflection coils 13.

It is desirable that the electron beam 7 approach the photo mosaic in a direction substantially perpendicular to the photo mosaic, and this may be accomplished by employing an axial magnetic coil 15.

The operation of the deflecting plates 11, the deflection coils 13 and the axial coil 15 is described in detail in the article on the image orthicon camera by Albert Rose, P. K. Weimer and H. B. Law entitled "The Image Orthicon, a Sensitive Television Pickup Tube," published in the "Proceedings of the Institute of Radio Engineers" for July 1946.

Heretofore, video signals have been obtained by a connection to the photo mosaic electrode 3 in the case of the orthicon and the iconoscope, as described in the articles entitled "The Orthicon, a Television Pickup Tube" by Albert Rose and Harley Iams, beginning on page 186 of the "RCA Review" for October 1939, and "Theory and Performance of the Iconoscope" by V. K. Zworykin, G. A. Morton and L. E. Flory, beginning on page 1071 of the "Proceedings of the Institute of Radio Engineers" for August 1937.

In the case of the popular image orthicon, the scanning beam is returned to an electrode adjacent the electron gun at which point the video signal is removed. The image orthicon is described in detail in the article referred to above entitled "The Image Orthicon, a Sensitive Television Pickup Tube."

For a proper understanding of the theory and operation of this invention, it is important to refer briefly to the fundamental theory and operation of reflex oscillators, and particularly oscillators of the reflex-Klystron type.

There is much information published on the reflex oscillators, and their theory and operation may be well understood by reference to the following articles and publications: "Reflex-Klystron Oscillators" by Edward Ginzton and Arthur Harrison, beginning on page 97 of the "Proceedings of the Institute of Radio Engineers" for March 1946; "Reflex Oscillators" by J. R. Pierce, beginning on page 112 of the "Proceedings of the Institute of Radio Engineers" for February 1945; "An Ultra-High-Frequency Power Amplifier of Novel Design" by Andrew V. Haeff, published in "Electronics" for February 1939; and the book entitled "Klystron Technical Manual," published by the Sperry Gyroscope Co. and copyrighted 1944.

Reflex oscillators of the reflex-Klystron type belong to a family of velocity modulation tubes.

Envelope 1 contains a resonant circuit involving either a closed loop or resonant cavity 17 connected to grid-like capacitive elements 19 and 21. The resonant circuit is positioned such that the capacitive elements 19 and 21 are positioned in the path of the electron beam 7, and have their principal plane substantially perpendicular to the electron beam 7.

It is well known that any closed circuit involving capacity and inductance may be made to oscillate by proper excitation. In accordance with this invention, and in accordance with the operation of the reflex oscillator of the velocity modulation type, the grid-like structures 19 and 21 are maintained at a sufficiently positive potential with respect to the electron gun 9 to accelerate the electrons to a sufficient speed so that even the electrons of the beam 7 which have lost a certain amount of energy on the first crossing of the gap formed by the elements 19 and 21 can still recross the gap against a retarding radio frequency field which results by reason of oscillation in the closed circuit involving the inductance 17 and the capacity resulting between plates 19 and 21.

By reference to Figure 1, it may be seen how velocity modulation and drift action are utilized for producing radio frequency power in the resonator circuit.

The electrons leave the gun 9 and enter the radio frequency field across the gap between capacitive elements 19 and 21 in a uniform stream, and there receive a velocity modulation due to the radio frequency oscillation set up in the resonator circuit involving the plates 19 and 21. In drifting to the retarding field produced by the repeller which, according to this invention, takes the form of a photo mosaic 3, and returning to the gap, the electrons which pass across the gap when the field was becoming progressively less accelerating became bunched, and the electrons which passed across the gap when the field was becoming progressively more accelerating became spread out. Thus, the returning electron stream forms a pulsating current when it again crosses the gap formed by the grid-like structures 19 and 21. It will be remembered that the current induced by a given electron in the circuit flows in opposite directions from the two successive transits across the radio frequency field in the gap. It can be seen that the electron stream will give power to the field across the gap when the time between leaving the field and returning across it is $n+3/4$ cycle, wherein "$n$" is any integer including zero.

An important characteristic of reflex oscillators of the Klystron type is the possibility of tuning them electronically. The frequency of oscillation can be changed by a substantial amount by varying the voltage of the electron repelling electrode, which in this case is the photo mosaic 3.

The fundamental variable in electronic tuning is the drift time of the electrons. Making the repeller for mosaic electrode 3 more negative shortens the drift time and increases the frequency of oscillation. This phenomena may be explained when it is understood that the electrons of beam 7 will traverse a shorter path when they are repelled at a greater distance from the photo mosaic 3 by reason of a more negative potential thereon.

It will be remembered, however, that the potential of any elemental area of the photo mosaic is dependent upon the amount of light falling upon that particular point. It therefore follows that the potential of the reflector or the photo mosaic will be dependent upon the light falling on the photo mosaic. The frequency of oscillation of the resonator will therefore be governed by the light falling on each elemental area of the photo mosaic 3 being scanned by the electron beam 7.

By collecting a portion of the energy in the resonator through coupling loop 23, amplifying it in frequency modulated amplifier 25, clipping it in clipper 27 and combining it in a frequency modulated transmitter 29 with appropriate synchronizing pulses derived from sync generator 31, a frequency modulated television signal may be produced.

Details for the frequency modulated amplifier 25, the clipper 27 and the frequency modulated transmitter 29, together with details for the sync generator 31, are not set out here in detail because any suitable devices of that character may be employed without departing from the spirit of this invention. Circuit elements of this type are adequately described in the present radio art.

In the operation of the iconoscope, the orthicon and the image orthicon referred to above, the electron beam actually makes contact with the photo mosaic and accordingly neutralizes the charges of the photo mosaic during each scansion. According to the operation of this invention, however, the electron beam 7 does not actually come in contact with the photo mosaic 3. However, in the operation of this invention the internal or leak resistance of the mosaic 3 is depended upon to neutralize the charge so that an image involving motion may be successfully converted into a signal train.

The residual charge may also be removed by sweeping the mosaic 3 with the electron beam 7 during return time, and this may be accomplished by charging the electrode 3 positively during the return time of the scanning of the beam 7. The positive charge on the photo mosaic will cause the electron beam to impinge on the photo mosaic during the return time to neutralize the charge collected thereon. In the form of the invention shown in Figure 1, this is accomplished by obtaining energy from the sync generator 31 during synchronizing pulse time and passing it through a blanking amplifier 33, which is connected to the conducting plate of mosaic electrode 3, to give it a positive charge during return time of the scanning of the beam 7.

This may also be accomplished in the manner shown and described in the patent of Alfred N. Goldsmith, No. 2,531,508, dated November 28, 1950, wherein the scanning beam is broadened and caused to sweep the target electrode during its return time.

Figure 2:
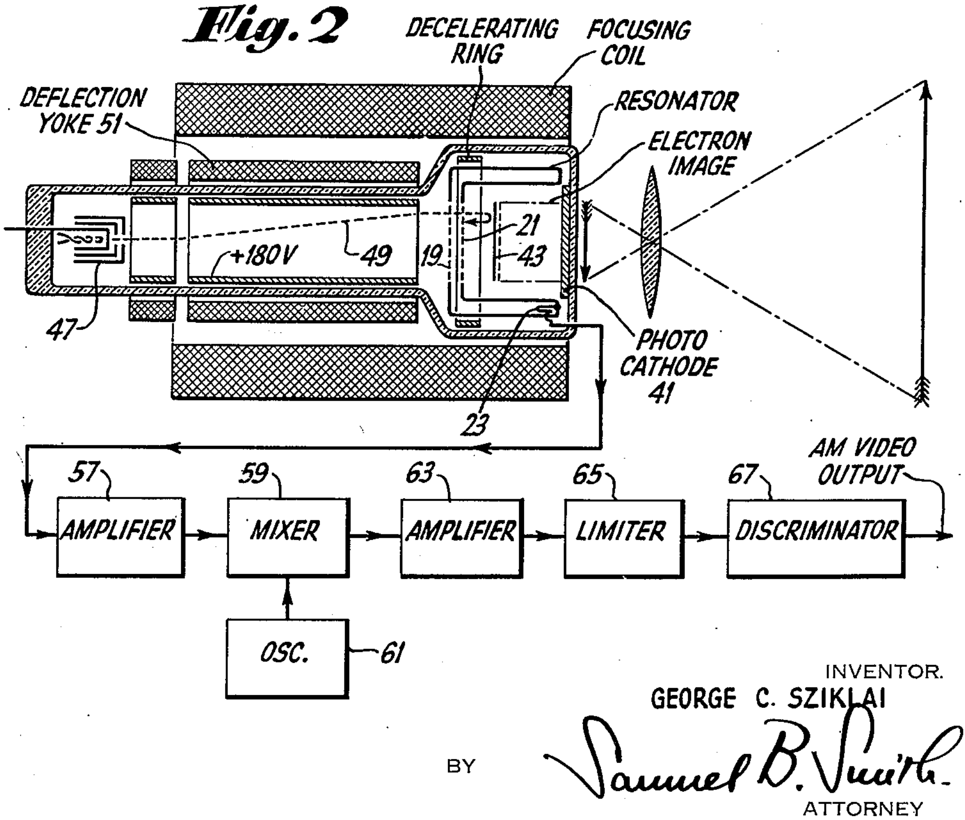
Figure 2 illustrates schematically and by block diagram another form of this invention.

Turning now to Figure 2, there is shown another form of this invention involving the use of a Klystron type reflex oscillator in conjunction with the tube of the image orthicon type, as referred to above. In the form of the invention shown in Figure 2, an image of the object or scene to be televised is focused on photo cathode 41, which produces an electron image which is directed to a mosaic electrode 43 to form an electron image. The transfer of the electron image from the photo cathode 41 to the electrode 43 is accomplished in a well known manner by focusing coil 45.

An electron gun 47 generates an electron beam 49, which is caused to scan the electrode 43 by deflection yoke 51 in the usual manner.

As electron beam 49 passes through the grid-like structures 19 and 21, which are like the grid-like structures 19 and 21 illustrated in Figure 1, an electrical oscillation will be started in the resonator 53 which, in the form of the invention shown in Figure 2, is enclosed inside the envelope including the electron gun 47 and the mosaic electrode 43. This oscillation will be maintained by the return of the electron beam 49 when the electrons of the beam 49 are reflected by the mosaic electrode 43. The closeness of approach of the electron beam 49 to the mosaic electrode 43 is governed by the elemental area potential of the mosaic electrode 43, which is in turn governed by the illumination of the photo cathode 41. As has been described in more detail under Figure 1 above, and in accordance with the operation of the reflex Klystron oscillator, the more negative the elemental area of the mosaic electrode 43, the higher the frequency of the oscillations in the resonator circuit 53.

A loop coupling device 23 is coupled to the resonator circuit 53 and provides energy for amplifier 57.

The frequency modulated signals are amplified in amplifier 57 and passed to mixer 59, where they are combined with signals from oscillator 61, which produces a frequency modulated signal representing the video signal and having a lower carrier frequency. The lower carrier frequency modulated signal is amplified in amplifier 63 and transmitted through a limiter 65, which performs the normal function of a limiter, which is to clip off spurious signals resulting from an amplitude modulation of the signal by noise and the like. The signal is then passed to a discriminator 67 to provide an amplitude modulated video signal output. The elements 57 to and including 67 are well known in the art and no particular types are required, except that it is important they be of the type adapted to pass wide frequency bands of signals in ultra high frequency ranges.

Figure 3:
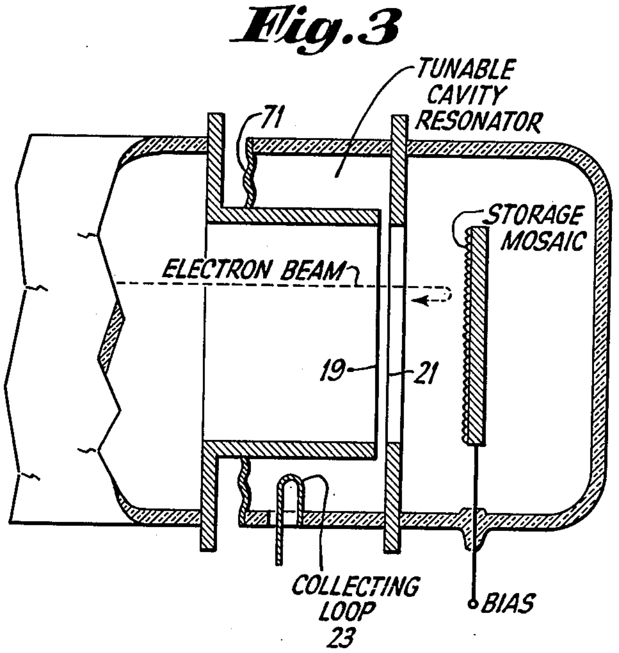
Figure 3 shows by sectional drawing the details of another form of this invention.

Turning now to Figure 3, there is shown an enlarged view of one form of this invention employing a tunable cavity resonator, as illustrated. Tunable cavity resonators in their application to Klystron oscillators are well known in the art, and their operation may best be explained when it is understood that when the spacing of the capacitive elements 19 and 21 is changed, the natural frequency of oscillation of the cavity resonator is also changed. Cavity resonators with re-entrant shapes may be tuned either by varying the volume of the resonator cavity or by changing the capacitive loading. In dealing with ultra high frequencies, it is obviously advantageous to have the oscillator circuit an integral part of the tube when tubes employing glass construction are used. It is necessary to provide a flexible metal diaphragm 71 to permit tuning.

Tuning the circuit by changing the spacing between the electrodes 19 and 21 imposes exacting requirements on the tuning mechanism, but the fact that the tuning mechanism can include means for compensating for the effect of thermal expansion on frequency, together with the advantages of eliminating sliding and cramping contacts which carry large R. F. currents, offset the disadvantages which may exist.

Moving the diaphragm changes the volume of the resonator slightly, but the capacitive change resulting from the change in spacing between elements 19 and 21 counteracts the volume change and is the principal factor in determining the resonator tuning. The volume of the resonator is decreased when the diaphragms are collapsed, increasing the resonant frequency slightly, but the increased capacity loading due to reduced resonator grid spacing offsets the decreased volume so that the resonant frequency of the Klystron circuit resonator is decreased when the diaphragm has collapsed.

There are two factors which affect the tuning range of the Klystron oscillator using variable grid spacing to control frequency. Electrons must traverse the electric field between the grids 19 and 21 in less than one-half cycle. This transit time limitation governs the minimum electron velocity and maximum grid spacing which can be used. The other limit to the tuning range is imposed by the fact that the Klystron oscillator fails to operate if the grids 19 and 21 are spaced too closely. An additional practical limitation is introduced by the fact that tuning becomes too critical before the failure to produce proper bunching is effective. These factors limit the practical tuning range to several percent of the average wave length. Considerably greater tuning range is easily obtainable at reduced output.

Additional flexibility may be obtained by providing an adjustable bias for the storage mosaic electrode 3. This is particularly useful in tuning.

At the ultra high frequencies at which the Klystron operates, coupling to the resonator may be accomplished with the small loop 23. This loop 23 normally terminates a coaxial line.

Figure 4:
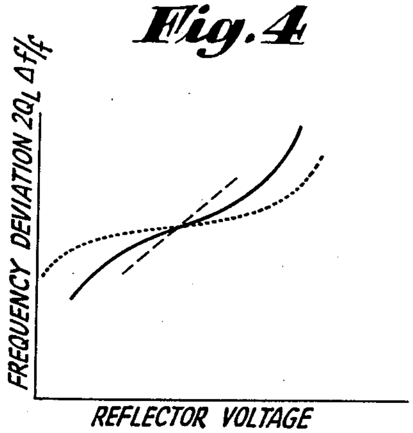
Figure 4 shows graphically several curves for the purpose of explanation of the operation of this invention.

Figure 4 illustrates graphically the frequency of the Klystron plotted against reflector voltage. The dashed line curve represents relative frequency variation with heavy loading. The heavy loading corresponds to a load which is almost great enough to prevent oscillation. The solid line represents relative frequency variation under optimum loading. The dotted line represents relative frequency of oscillation under light loading. It can be seen that the sloping of the linear portion of each curve of the frequency characteristic is inversely proportional to the loaded Q of the resonator.

Increasing the Q by decreasing the load does not decrease the electronic-tuning band width, as might be expected, since this change will increase the bunching and the phase angle may be varied over a larger range before the output decreases appreciably. The band width between zero-output points actually increases as the loading is decreased, and the band width between half-power points is decreased only slightly. Decreased loading causes the amplitude characteristic to become more uniform over a large range of voltage, but the frequency-deviation curve becomes quite non-linear.

Although an oscillator of the type involving grid-like structures 19 and 21 is shown and described for the purpose of explanation of the operation of this invention, it is not intended that its structure should be so limited. For example, the principle involved in the operation of the inductive output tube may be employed. This tube is well known to the art and is described in an article entitled "A Wide Band Inductive-Output Amplifier," beginning on page 126 of the "Proceedings of the Institute of Radio Engineers" for March 1940. In such a tube, the electrons pass an air gap in an inductance. Oscillation is produced by the effect of the charge of the bunched electrons on the adjacent part of the inductive conductor.

Having thus described the invention, what is claimed is:

1. A device for converting images into electric signal trains comprising in combination an electron reflector electrode having an electron image forming surface, means for directing an electron scanning beam at said image forming surface, and a resonant signal output circuit having a capacitive element and an inductive element, said capacitive element comprising a pair of grid-like structures positioned in the path of said electron beam whose principal plane is substantially parallel to said reflector electrode.

2. A device for converting optical images into video signals comprising in combination an image responsive electrode having an electron image storing surface, an electron gun for directing an electron beam at said electrode, beam deflection means for causing said beam to scan in a predetermined raster, and a signal output circuit including a resonant circuit having an inductive element extending in a line parallel to the path of said scanning beam, and wherein said inductive element contains a gap adjacent to the path of said scanning beam.

3. A device for converting images into electric signal trains comprising in combination a reflector electrode having a mosaic surface adapted to receive an electron image, means for directing an electron scanning beam at said image forming surface, and a resonant signal output circuit including a cavity resonator having a re-entrant shape and having a capacitive section of substantially parallel grid-like elements positioned transverse to said electron beam through which said electron beam is directed substantially parallel to the electric lines of force.

4. A device for converting images into electric signal trains comprising in combination an electron reflector electrode having an electron image forming surface, means for directing an electron scanning beam at said image forming surface, and a resonant signal output circuit having a capacitive element and an inductive element, said capacitive element comprising a pair of grid-like structures positioned in the path of said electron beam whose principal plane is substantially parallel to said reflector electrode, an amplifier for said electrical signal trains, and a coupling device connected between said resonant signal output circuit and said amplifier.

5. A device for converting images into electric signal trains comprising in combination an electron reflector electrode having an electron image forming surface, means for directing an electron scanning beam at said image forming surface, and a resonant signal output circuit having a capacitive element and an inductive element, said capacitive element comprising a pair of grid-like structures positioned in the path of said electron beam whose principal plane is substantially parallel to said reflector electrode, and a frequency discriminator connected to said resonant signal output circuit to derive therefrom an amplitude modulated electric signal train representative of an optical image.

6. A device for converting images into electric signal trains comprising in combination an electron reflector electrode having an electron image forming surface, means for directing an electron scanning beam at said image forming surface, and a resonant signal output circuit having a capacitive element and an inductive element, said capacitive element comprising a pair of grid-like structures positioned in the path of said electron beam whose principal plane is substantially parallel to said reflector electrode, and means connected to said reflector electrode for periodically sweeping the difference in charges from said image forming circuits.

GEORGE C. SZIKLAI.

References Cited in the file of this patent

UNITED STATES PATENTS

| Number | Name | Date |
| --- | --- | --- |
| 2,262,123 | Sukumlyn | Nov. 11, 1941 |
| 2,368,328 | Rosencrans | Jan. 30, 1945 |
| 2,408,437 | McRae | Oct. 1, 1946 |
| 2,409,179 | Anderson | Oct. 15, 1946 |
| 2,418,735 | Strutt et al. | Apr. 8, 1947 |
| 2,427,382 | Boothroyd | Sept. 16, 1947 |
| 2,433,941 | Weimer | Jan. 6, 1948 |